United States Patent [19]

Johnston et al.

[11] Patent Number: 4,879,819

[45] Date of Patent: Nov. 14, 1989

[54] GAUGE FOR COUPLING COMPONENT

[75] Inventors: Lonnie E. Johnston, Bedford; Steven J. Volcansek, Garfield Heights, both of Ohio

[73] Assignee: Crawford Fitting Company, Solon, Ohio

[21] Appl. No.: 253,962

[22] Filed: Oct. 5, 1988

[51] Int. Cl.⁴ .............................................. G01B 5/14
[52] U.S. Cl. ...................................... 33/833; 33/529; 33/555.1
[58] Field of Search ................. 33/529, 700, 501, 832, 33/833, 655

[56] References Cited

U.S. PATENT DOCUMENTS

| | | |
|---|---|---|
| 1,758,271 | 5/1930 | Zitzmann . |
| 2,400,293 | 5/1946 | Dunn . |
| 2,427,685 | 9/1947 | Midtlyng et al. . |
| 2,667,701 | 2/1954 | Davis . |
| 2,747,289 | 5/1956 | Jenkins . |
| 2,807,882 | 10/1957 | Lovenston . |
| 3,201,859 | 8/1965 | Stanley . |
| 3,255,521 | 6/1966 | Callahan, Jr. . |
| 3,287,813 | 11/1966 | Lennon et al. . |
| 3,318,007 | 5/1967 | Goetz . |
| 3,786,677 | 1/1974 | Spontelli . |
| 3,936,945 | 2/1976 | Jevremov . |
| 4,283,857 | 8/1981 | Graham et al. . |
| 4,306,448 | 12/1981 | Rohde . |
| 4,331,019 | 5/1982 | Smith . |

OTHER PUBLICATIONS

American Machinist, Jan. 15, 1948, p. 121.

Primary Examiner—Harry N. Haroian
Attorney, Agent, or Firm—Fay, Sharpe, Beall, Fagan, Minnich & McKee

[57] ABSTRACT

A gauge for fittings of the type including a coupling nut having a threaded internal opening and adapted to encircle a cylindrical member and a ferrule positioned on the cylindrical member, the gauge being used for determining the pull up of the ferrule and the swaging of the cylindrical member, includes an indicating unit having a readout for showing whether the swaging of the cylindrical member is within tolerances. A piston is movably mounted on the indicating unit and is operatively connected to the readout. The piston includes a body having a bore and an external threaded area on the body circumferentially of the bore to threadedly engage the threaded internal opening of the coupling nut carried on the cylindrical member. The piston further includes a section within the bore for aligning the cylindrical member with the bore and for limiting the extent of movement of the cylindrical member into the bore. A master is provided for calibrating the gauge. The gauge is used in a method for determining the swaging that a cylindrical member has undergone.

26 Claims, 2 Drawing Sheets

GAUGE FOR COUPLING COMPONENT

BACKGROUND OF THE INVENTION

This invention is directed toward the art of joints and couplings. More particularly, the invention relates to an apparatus for testing the adequacy of swaging of tubes or pipes.

The present invention is especially suited for use in testing the adequacy of pull up of ferrules of swage type tube fittings on tubes or pipes and hence the adequacy of the swaging operation and will be described with particular reference thereto. It should, however, be appreciated that the subject invention is capable of broader applications and could be used for testing the adequacy of pull up of ferrules onto cylindrical members that are used for many different purposes.

Swage type tube or pipe fittings have become widely used. These fittings generally employ one or more ferrules which encircle the tube or pipe to be coupled. As the coupling nut is advanced on the coupling body, the ferrule or ferrules are subjected to axial pressure and are forced into a tapered mouth in the coupling body thereby causing the ferrule to contract upon the tube or pipe. In this way, the ferrule is progressively deformed into a gripping and sealing engagement with the tube or pipe by a radial contraction of the ferrule due to the interaction of the coupling nut and the fitting body. Since the contraction of the ferrule upon the tube or pipe is produced by an advancement of the coupling nut along the coupling body, it is apparent that the amount of contraction of the ferrule is determined by the amount of advancement of the coupling nut.

To a considerable extent, the successful utilization of couplings of the aforementioned type depends upon a controlled constriction or swaging of the walls of the tubular member to be coupled. In fittings of this type, the optimal amount of tube wall constriction or swaging is a predetermined quantity depending upon the correct amount of linear nut advancement necessary to produce the optimum amount of swaging. If the coupling nut is not advanced far enough, the ferrules will not be contracted or collapsed sufficiently to produce the required swaging of the tube wall. An insufficient swaging results in a connection which is susceptible to leakage. On the other hand, should the coupling nut be advanced more than the prescribed amount, the annular ferrules will be overcontracted upon the tube wall causing an overswaging of the tube. Such excessive swaging may result in reducing the number of times that the fitting can be disconnected and remade. It can also cause a rupture of the tubular member wall or at least create fluid flow problems in the tubular member.

In making an effective and tight connection between a tube or pipe in this type of fitting, it is also important that the dimensional relationships between the tube or pipe and the various components of the fitting not vary appreciably from those prescribed. Deviations from the prescribed tolerances on the amount of radial contraction of the ferrules onto the tube or pipe to create a clinching grip on the tube or pipe may result in unsatisfactory connections leading to inadequate sealing and leakage.

While there have been some devices which measure the amount of swaging or tube deformation that has occurred between a cylindrical body and a fitting, none of these has been found to be fast, easy to use and precise in its readout of the adequacy of swaging. Also, none of the current measuring devices can be selectively recalibrated as desired. Further, none of the current measuring devices are provided with a master to check the accuracy of the readings provided by the measuring device.

Accordingly, it has been considered desirable to develop a new and improved device for measuring the adequacy of swaging which would overcome the foregoing difficulties and others while providing better and more advantageous overall results.

BRIEF SUMMARY OF THE INVENTION

In accordance with the present invention, a gauge for fittings of the type including a coupling nut having a threaded internal opening and adapted to encircle a cylindrical member and a ferrule positioned on the cylindrical member is provided. The gauge is used for determining the pull up of the ferrule and the deformation or swaging that the cylindrical member has undergone.

More particularly in accordance with this aspect of the invention, the gauge comprises an indicating unit having a readout means for showing whether the swaging of the cylindrical member is within tolerances. A piston is movably mounted in the indicating unit and is operatively connected to the readout means. The piston comprises a body having a bore and an external thread means on the body circumferentially of the bore to threadedly engage the threaded internal opening of the coupling nut carried on the cylindrical member. A means is provided within the piston body bore for aligning the cylindrical member with the bore and for limiting the extent of movement of the cylindrical member into the bore.

According to another aspect of the invention, a gauge is provided for determining the pull up to an outer periphery of a cylindrical pipe or tube that a ferrule has undergone and the swaging of the pipe or tube by a fitting of the type including a coupling nut having a threaded internal opening and adapted to encircle the pipe or tube and a ferrule positioned on the pipe or tube.

More particularly in accordance with this aspect of the invention, the gauge comprises an indicating unit and a base secured to the indicating unit and including a longitudinally extending bore. A piston is slidable in the base bore. The piston comprises a body having a bore and an external thread means on the body circumferentially of the bore to threadedly engage the threaded internal opening of the coupling nut which is carried on the pipe or tube. A tapered mouth is formed in the bore for aligning the pipe or tube with the bore and for limiting the extent of movement of the pipe or tube into the bore. A means is provided for limiting a sliding movement of the piston in the base bore.

According to a further aspect of the invention, a method is provided for determining the swaging that a cylindrical member has undergone by a ferrule positioned on the outer periphery of the cylindrical member.

More particularly in accordance with this aspect of the invention, the method comprises the steps of providing a swaged cylindrical member having a coupling nut with a threaded internal opening that is adapted to encircle the cylindrical member and a ferrule pulled up on the cylindrical member. An indicator unit is provided that has a readout means for indicating acceptable and unacceptable swaging as well as a base and a piston secured thereto. The piston includes a bore that is adapted to receive a portion of the cylindrical member and includes an external threaded section. The fitting coupling nut is threaded onto the piston threaded section. The swaged fitting cylindrical member is then pushed into contact with the indicator base thereby changing the readout means. The readout means of the indicator unit is thereupon viewed to see whether the swaged fitting is acceptable or unacceptable.

According to a still further aspect of the invention, a device is provided for calibrating a gauge which measures the swaging of a cylindrical member.

More particularly in accordance with this aspect of the invention, the device comprises a coupling nut having a threaded internal opening and a gauge pin extending through the coupling nut internal opening. The gauge pin comprises a first section of a first diameter and a second section of a second diameter which is larger than the first diameter. A fastener means is provided for securing the gauge pin to the coupling nut.

One advantage of the present invention is the provision of a new means for testing the adequacy of a ferrule setting or swaging operation.

Another advantage of the present invention is the provision of a gauge which enables one to determine whether a ferrule has been adequately pulled up on a cylindrical member and whether the cylindrical member has been correctly swaged.

Still another advantage of the present invention is the provision of a gauge, which checks the amount of swaging of a cylindrical member, with a means for calibrating the gauge to check the accuracy of the readings provided by the gauge.

A further advantage of the present invention is the provision of a tube or pipe swaging gauge which is so constructed that it can be modified or adjusted as necessary in order to test the adequacy of swaging of tubes or pipes of different diameters and with different types of fittings.

A still further advantage of the present invention is the provision of a gauge for testing the adequacy of swaging of a cylindrical member with a visual readout which enables one to ascertain quickly and conveniently whether the swaging of the cylindrical member is within acceptable limits.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
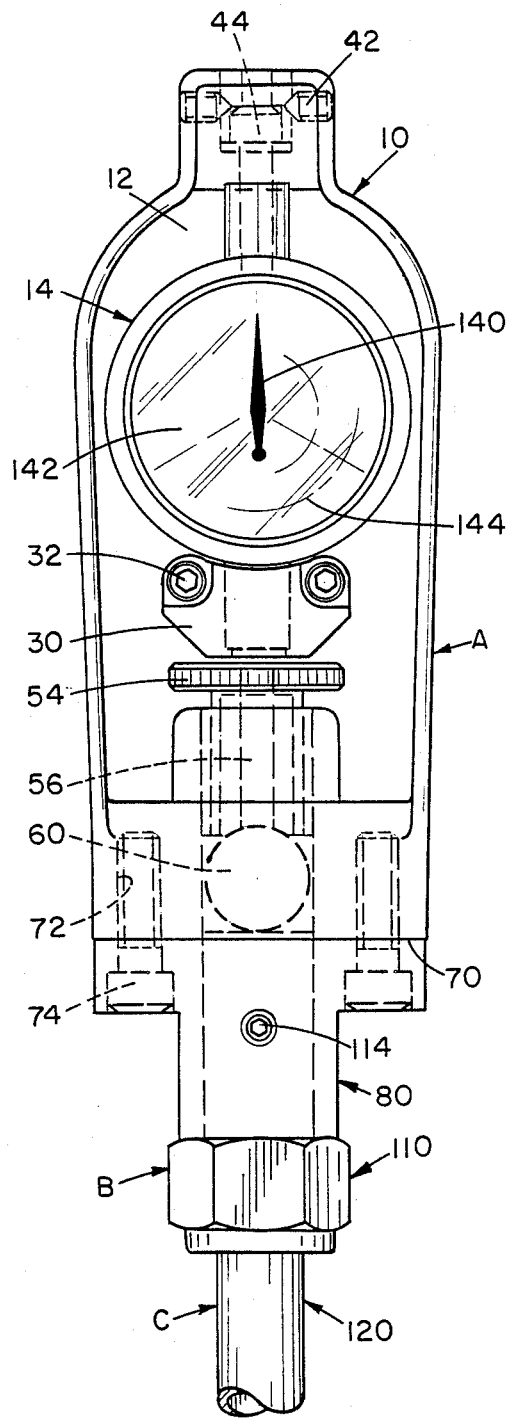
FIG. 1 is a front elevational view of a gauge according to the present invention which is shown as measuring the adequacy of swaging of a cylindrical member.

Referring now to the drawings, wherein the showings are for purposes of illustrating a preferred embodiment of the invention only and not for purposes of limiting same, FIG. 1 shows the subject new gauge unit A that is used for testing the adequacy of swaging of one or more components of a fitting B onto a cylindrical member C. While the gauge is primarily designed for and will hereinafter be described in connection with a particular type of fitting, it will be appreciated that the overall inventive concept involved could be adapted for use with other types of fittings and other types of cylindrical bodies as well.

Figure 2:
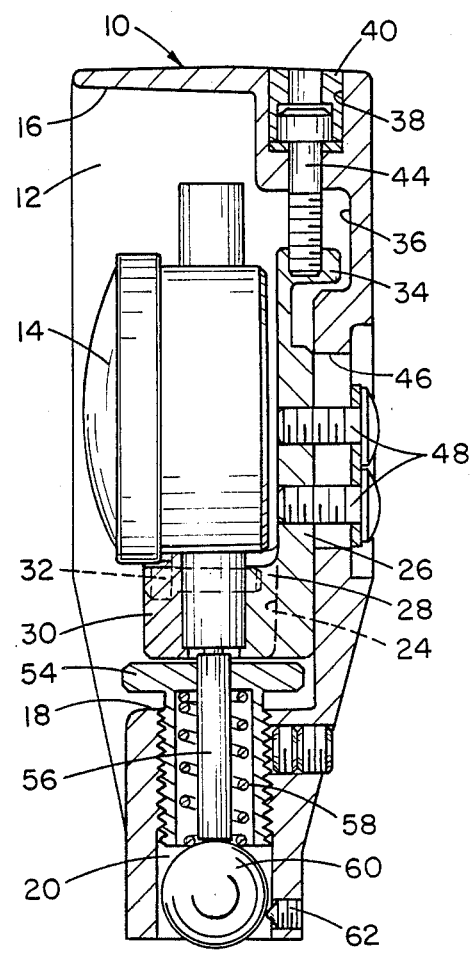
FIG. 2 is a side elevational view partially in cross-section of a portion of the gauge of FIG. 1.

With reference now to FIG. 2, the gauge unit comprises a housing 10 which is generally elongated and is provided at one side with a relatively long recess 12 which houses a dial indicator 14 between a top wall 16 and a bottom wall 18. The bottom wall 18 is relatively thick and is provided with a passage 20 extending therethrough and communicating with the interior recess 12. The housing 10 is also provided with a keyway indicated generally at 24 in which is longitudinally slidable a key slide 26. At its lower end, the key slide 26 has a forwardly projecting recessed portion 28 adapted to receive a clamping element 30 which can be secured to the forwardly projecting portion by suitable fasteners 32. The clamping element 30 cooperates with the key slide to engage the lower portion of the dial indicator 14 and to carry it for vertical adjustment.

At its upper end, the key slide 26 includes a rearwardly extending lug 34 which is threaded and which is movable in an elongated seat 36 formed in the inner wall of the housing. The top wall 16 of the housing includes a recess 38 in which is received an adjustment retainer cap 40. The cap is retained in position by a pair of set screws 42 (FIG. 1) or the like. Retained in position by the adjustment retainer cap 40 is an adjustment screw 44 the lower end of which is threadedly engaged with the lug 34 of the keyway slide.

In addition, the housing is provided on the outer face of its back wall with an elongated slot 46 through which extend a pair of clamping screws 48. These screws are threadedly engaged with the key slide 26. It will be readily apparent that when the screws 48 are loosened, the dial gauge 14 may be adjusted vertically by appropriate rotation of the adjusting screw 44 and the indicator may thereafter be locked in the adjusted position by again tightening the clamping screws 48. The passage 20 is threaded and receives an adjusting thimble 54 which has an opening therethrough for receiving a plunger 56 of the dial indicator. The opening through the thimble is enlarged at the lower portion thereof for reception of a light compression spring 58. Below the lower end of the thimble 54 is received a ball 60. A set screw 62 is provided in the housing 10 for preventing movement of the ball 60 out of the passage 20.

The ball 60 has a range of movement limited outwardly by its engagement with the set screw 62 and inwardly by its engagement with a lower end of the adjusting thimble 54. It will be apparent that the thimble 54 may be adjusted independently of the key slide 26 by a simple turning motion thereof.

Figure 3:
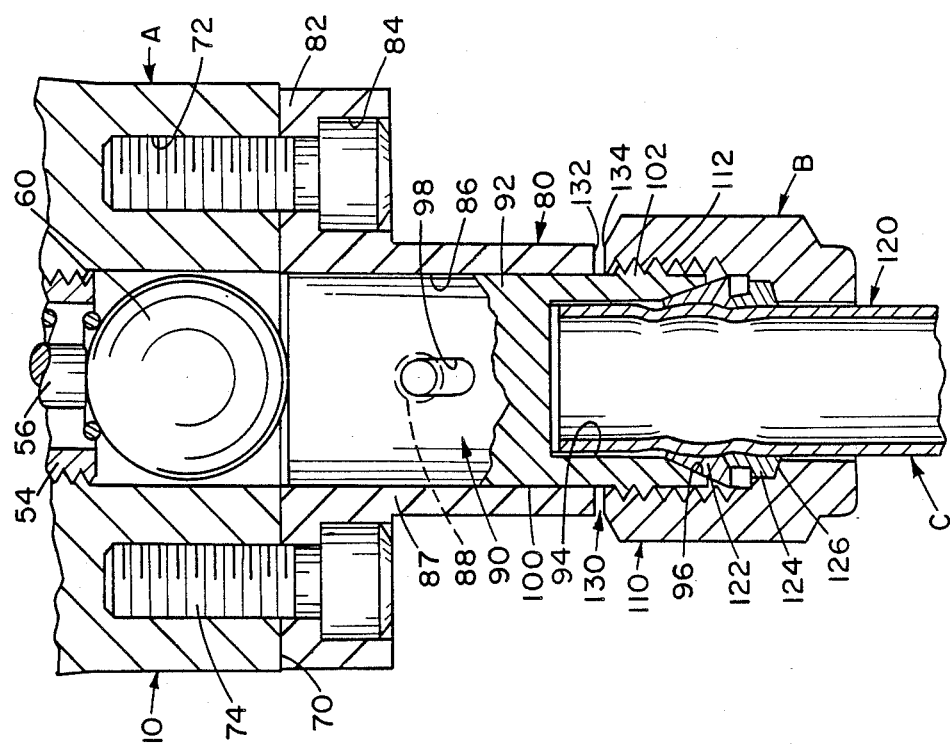
FIG. 3 is an enlarged front elevational view in partial cross-section of a portion of the gauge of FIG. 1; and, FIG. 4 is an enlarged front elevational view in partial cross-section of a portion of the gauge of FIG. 1 having a master secured thereto instead of a fitting, the master being used to check the accuracy of the readings provided by the gauge.

With reference now to FIG. 3, the housing lower end includes a flat surface 70 tapped as indicated at 72 for the reception of fasteners 74. A gauge of the type described above is available from the A. G. Davis Gauge and Engineering Company of Hazel Park, Mich.

The fasteners 74 are adapted to secure a base 80 to the gauge. The base 80 includes a flanged portion 82 having apertures 84 extending therethrough which are suitably counterbored for receipt of the fastener heads. A bore 86 extends longitudinally through a main portion 87 of the base 80. Additionally, a threaded aperture 88 extends through the wall of the base main portion and communicates with the bore 86 therein.

A piston 90 is adapted to be slidably secured in the bore 86. The piston has a body 92 which is provided at one end with an axial bore or aperture 94 extending thereinto. At the front end of the piston aperture 94 is provided an outwardly tapered mouth surface or seat 96. A slot 98 is machined into an outer periphery 100 of the piston 90. The slot 98 is so located as to communicate with the aperture 88 in the base 80. A threaded section 102 is provided on the piston outer periphery 100 circumferentially of the aperture 94 to receive a coupling nut 110 which is internally threaded as at 112.

The piston 90 is held in the base 80 through the cooperation of a threaded fastener 114 (FIG. 1) which extends through the threaded aperture 88 of the base 80. A free end of the fastener 114 extends into the slot 98 in the piston to control the range of movement that the piston can have in relation to the base. If desired the piston can move a limited amount such that in a lower position, an inner end of the piston is below the flat 25 surface 70 of the gauge body 10 (see FIG. 3) and in an upper position, the inner end of the piston is above the flat surface 70 (see FIG. 1). As the piston 90 moves, the ball 60 is moved as is the plunger 56 of the dial indicator 14. In this way, the piston is operatively connected to the dial indicator.

The nut 110 of the fitting B is of the type adapted to encircle a cylindrical member 120 such as a pipe or tube and at least one ferrule positioned on the cylindrical member. In the embodiment illustrated, the fitting includes a front ferrule 122 and a back ferrule 124. It should, however, be appreciated that the fitting B could have other configurations as well. The back ferrule is held in a captive relationship between the front ferrule and an internal annular flange 126 formed on the unthreaded end of the coupling nut 110 internal wall. When a suitable deformation operation has been performed on the ferrules, the generally tapered shape of the ferrules 122, 124 will cause a sequential inward gripping of the cylindrical member 120 as is well known in the art and as is evident from FIG. 3.

In a swage type fitting of the nature here involved, the amount of swaging or deformation of the cylindrical member 120 is very critical since too great a deformation or swaging will cause an internal obstruction in the member 120 and create fluid flow problems as well as possibly a rupture of the cylindrical member and assuredly a defective connection. On the other hand, an inadequate amount of swaging will produce an unstable or unreliable fitting and allow a leakage of fluids.

In practice, the various elements of the fitting are manufactured to extremely close tolerances and the fitting is most often used in connection with tubing which is manufactured within very close tolerances as well. The coupling assembly is generally shipped to the user in a finger tight condition and for use is slipped onto the tubing until the tube abuts against the seat of the coupling body.

Various ways and means have been used to control very accurately the amount of swaging or gripping between the coupling and the cylindrical body. One technique has been to use a fixed gauge between the forward portion of the coupling nut and the body to which the nut is meant to be coupled until further advance is arrested by the gauge. Another practice has been to rotate the coupling nut a prescribed amount. When the prescribed tolerances of all the critical elements in the fitting as well as the dimensions of the pipe are adhered to accurately, the aforementioned methods of assembly have generally proven adequate. Difficulty arises, however, if the cylindrical member is not within tolerances or if the methods of assembly are not accurately followed.

Accordingly, several swaging tools are known to the art which are meant to provide an hydraulically powered swaging of a cylindrical body.

Whichever technique of swaging is used, a need exists for ascertaining whether the swaging has been correctly performed. In other words, it would be beneficial to know whether the ferrule or ferrules have been correctly pulled up on the cylindrical member. The gauge device of the present invention can be used for this purpose. The gauge is so configured that the coupling nut of the fitting and the ferrule(s) thereof engage the piston and thereafter the cylindrical member 120 can be pushed into the gauge member, together with the piston, to ascertain whether the swaged member 120 is within tolerances.

For this purpose, the nut 110 is threaded onto the piston 90 in a finger tight manner. At this point, the front ferrule 122 engages the piston tapered mouth surface 96 to prevent the cylindrical member 120 from sliding further into the piston aperture 94. Thereafter the swaged assembly, and the piston 90, are pushed into the gauge base 80 and the dial 14 is read. A means is provided for limiting the motion of the piston 90 into the base 80.

In this connection, the nut 110 after it has been threaded onto the piston 90 is, as shown in FIG. 3, able to travel a distance 130 between confronting planar substantially parallel faces 132 of the base 80 and 134 of the nut 110. As may be seen from FIG. 1, when the nut 110 is abutting the base 80, a needle 140 of the dial indicator 14 should read within an acceptable swaging range 142 on the dial and not within an unacceptable range 144.

The geometry and dimensional interrelationship of the components are such as to insure that the inventive gauge will operate correctly when measuring all conventional swaging operations of a cylindrical body to indicate whether the swaging operation has been performed within accepted tolerances.

If desired, the gauge can be preset so that when at rest the needle 140 reads at approximately nine o'clock. The movement of a correctly swaged assembly against the gauge base will then pivot the needle approximately 450° clockwise into the zero or twelve o'clock position as is illustrated in FIG. 1. In the preferred embodiment, the gauge can be so set that the needle cannot swing back into the acceptable range 142 more than once after having rotated through the unacceptable range 144. Of course, other ways of controlling the motion of the gauge needle can also be selected. It should be recognized that the setting of the needle can be changed as desired simply by a rotation of the knob 54.

When the gauge is at rest, there is no force exerted on the piston 90 pushing it into the base 80. At this time, the spring 58 serves as a means for biasing the piston away from the housing 10, and the base 80 secured thereto, by urging the ball 60 downwardly in the bore 20 to the extent allowed by the set screw 62. The ball 60 in turn urges the piston 90 downwardly in the base 80 to the extent allowed by the slot 98 cut in the piston outer periphery.

Figure 4:
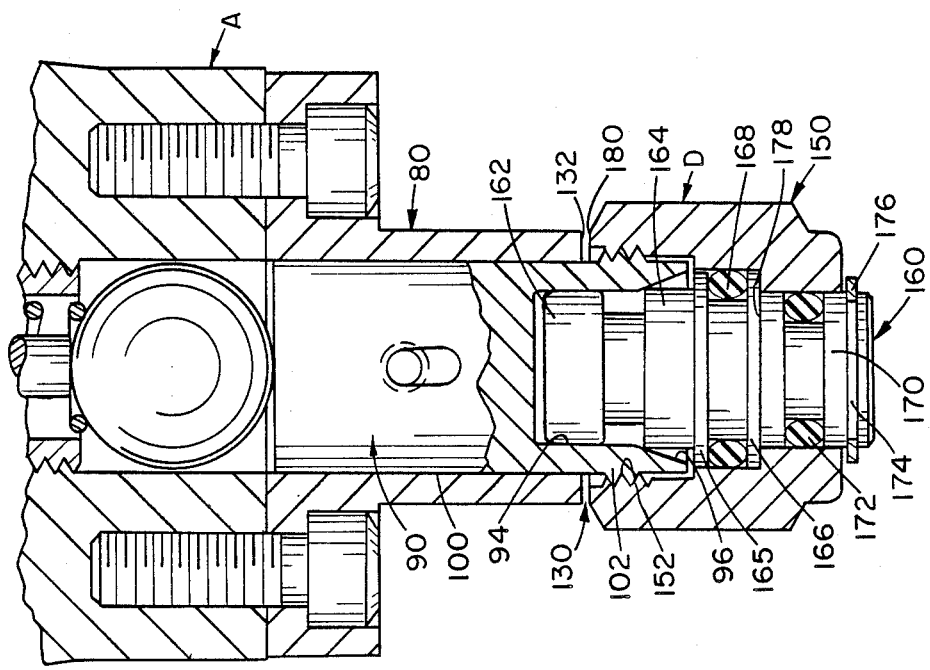

With reference now also to FIG. 4, a master D can be utilized with the gauge A as a means for checking the accuracy of the readings provided by the gauge. The master D comprises a nut 150 having a threaded inner periphery 152 which can be threaded onto the threaded section 102 provided on the outer periphery 100 of the piston 90. Held in the nut 150 is a gauge pin 160 which includes first and second spaced sections 162, 164 that are of different diameters. The first section 162 is of a diameter which can slide into the aperture 94 in the piston 90. The second section 164 is of a somewhat larger diameter which will be restricted from continued movement into the piston aperture 94 by engagement with the tapered surface 96 as is evident from FIG. 4. In this way, the gauge pin is limited in its sliding motion into the piston 90. A pair of flanges 165, 166 can also be positioned on the gauge pin in a spaced manner for confining a seal 168 therebetween. A recessed area 170 can also be provided on the pin in a spaced manner from the flanges 166 for holding a second seal 172. An additional recess 174 can be provided on the gauge pin 160 for housing a snap ring 176 which restricts the movement of the gauge pin in one direction in relation to the nut 150. Movement of the gauge pin in the other direction in relation to the nut is prevented by an engagement of a back side of the flange 166 with an inner face 178 of the nut.

While the seal elements 168 and 172 are not always necessary, they are considered to be advantageous in order to prevent any dirt or particles from locating between the nut inner face 178 and a back side of the flange 166 when the master is used in a dirty environment. Should any dirt accumulate on the nut face 178, the measurements provided by the master would be erroneous. However, it should be appreciated that there may not be a need for such sealing elements 168, 172 when the master is utilized in a clean environment.

In use, the accuracy of readings provided by gauge is checked with the master by threading the master onto the gauge piston 90 in a finger tight manner, thereafter the master is pushed into the gauge until a face 132 of the base 80 is contacted by a face 180 of the nut, thereby eliminating the gap 130 between them, much as in FIG. 3. At this point, the needle 140 shown in FIG. 1 should read zero or twelve o'clock.

In other words, when the master nut 150 has been threaded finger tight on the gauge piston 90, the setting of the needle 140 on the dial can be much the same as with the coupling B such that the initial setting of the needle 140 is at the nine o'clock position. Thereafter, the needle 140 should swing around approximately 450° clockwise to the zero or twelve o'clock position as the master is pushed into the gauge, if the gauge is correctly calibrated. Should this not be the case, the gauge can be recalibrated as desired so that it again indicates correctly when the master is used. Thereafter, the gauge can again be used in measuring the swaging of various cylindrical members.

It should be appreciated that the gauge can be adapted for use with different tube or pipe diameters and different types of couplings, i.e. having only one ferrule, simply by a replacement of the piston 90 with a suitably sized and apertured piston having a desired tapered mouth or seat.

Generally the gauge and its master are set by its manufacturer during assembly. Normally readjustment of the gauge should not be done except when the master indicates that the gauge is reading inaccurately.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A gauge assembly for fittings of the type including a coupling nut having a threaded internal opening and adapted to encircle a cylindrical member and a ferrule positioned on the cylindrical member, the gauge being used for determining the pull up of the ferrule and the deformation or swaging that the cylindrical member has undergone, the gauge assembly comprising:
   an indicating unit having a readout means for showing whether the swaging of the cylindrical member is within tolerances; and,
   a piston movably mounted in said indicating unit and operatively connected to said readout means, said piston comprising:
   a body having a bore,
   an external thread means on said body circumferentially of said bore for threadedly engaging the threaded internal opening of the coupling nut carried on the cylindrical member, and
   a means within said bore for aligning the cylindrical member with said bore and limiting the extent of movement of the cylindrical member into said bore.

2. The gauge assembly of claim 1 wherein said means for aligning said cylindrical member and limiting the movement of said cylindrical member comprises a tapered mouth surface formed in said bore, said tapered surface cooperating with the ferrule located on the outer surface of the cylindrical member.

3. The gauge assembly of claim 1 further comprising a first means for limiting a movement of said piston in said indicating unit.

4. The gauge assembly of claim 3 wherein said indicator unit further comprises a base section having an axially extending bore in which said piston is movably mounted and wherein said first means for limiting the movement of said piston comprises parallel surfaces provided on said base and on the nut, respectively, the movement of said piston into said base ceasing when said parallel surfaces contact each other.

5. The gauge assembly of claim 1 wherein said readout means comprises a dial provided with a pivotable needle and wherein said needle is adapted to pivot as said piston is slid into said indicating unit.

6. The gauge assembly of claim 4 further comprising:
   a means for securing said piston in said base; and,
   a second means for limiting the movement of said piston in relation to said base.

7. The gauge assembly of claim 6 wherein said means for securing said piston in said base comprises:

a fastener including a head and a stem; and,
a bore extending through said base for accommodating said fastener stem.

8. The gauge assembly of claim 7 wherein said second means for limiting the movement of said piston in said base comprises an elongated slot into which a free end of said fastener stem extends.

9. The gauge assembly of claim 1 further comprising a means for calibrating the proper setting of said readout means.

10. The gauge assembly of claim 9 wherein said means for calibrating comprises:
   a coupling nut having a threaded internal opening;
   a gauge pin extending through said coupling nut and having a section of suitable diameter that it engages said means within said piston bore for aligning and limiting; and,
   a fastener means for securing said gauge pin to said coupling nut.

11. The gauge of claim 1 further comprising a means for biasing said piston away from said indicating unit.

12. A gauge assembly for determining the pull up to an outer periphery of a cylindrical pipe or tube that a ferrule has undergone and the swaging of the pipe or tube by a fitting of the type including a coupling nut having a threaded internal opening and adapted to encircle the pipe or tube and a ferrule positioned on the pipe or tube, comprising:
   an indicating unit;
   a base secured to said indicating unit and including an axially extending bore;
   a piston slidable in said base bore, said piston comprising:
      a body having an axially extending bore,
      an external thread means on said body circumferentially of said bore to threadedly engage the threaded internal opening of the coupling nut carried on the pipe or tube, and
      a tapered mouth formed in said bore for aligning the pipe or tube with said bore and limiting the extent of movement of the pipe or tube into said bore; and,
   a means for limiting a sliding movement of said piston in said base bore.

13. The gauge assembly of claim 12 wherein said indicating unit comprises:
   a body;
   a dial provided on said body; and,
   a dial needle pivotally secured to said dial and operatively connected to said piston.

14. The gauge of claim 12 wherein said means for limiting the movement of said piston comprises parallel surfaces provided on said base and on the nut, the sliding movement of said piston into said base ceasing when said parallel surfaces contact each other.

15. The gauge of claim 12 further comprising a means for securing said piston to said base.

16. The gauge of claim 15 wherein said means for securing comprises:
   a fastener including a head and a threaded stem;
   a threaded bore extending through said base for accommodating said fastener threaded stem; and,
   an elongated slot provided on an outer periphery of said piston into which slot a free end of said fastener stem extends, said piston being able to slide in relation to said fastener to the extent allowed by said slot.

17. The assembly of claim 13 further comprising a master which calibrates the readout provided by said dial needle, said master comprising:
   a coupling nut having a threaded internal opening;
   a gauge pin extending through said coupling nut and adapted for engaging said piston tapered mouth; and,
   a fastener for securing said gauge pin to said coupling nut.

18. A method for determining the swaging that a cylindrical member has undergone by a ferrule positioned on the outer periphery of the cylindrical member, comprising:
   providing a swaged cylindrical member having a coupling nut with a threaded internal opening that is adapted to encircle the cylindrical member and a ferrule pulled up on the cylindrical member;
   providing an indicator unit having a readout means for indicating acceptable and unacceptable swaging, a base and a piston secured thereto, said piston including a bore, adapted to receive at least a portion of the cylindrical member, and an external threaded section;
   threading said fitting coupling nut onto said piston threaded section;
   pushing said swaged cylindrical member into contact with said indicator base thereby changing said readout means; and,
   viewing said readout means of said indicator unit to ascertain whether the swaged cylindrical member is acceptable.

19. The method of claim 18 wherein said readout means comprises a needle pivotally mounted on a dial and wherein said step of pushing will pivot said needle in relation to said dial.

20. The method of claim 18 wherein said step of pushing ceases when said coupling nut contacts said indicator unit base.

21. A device for calibrating a gauge which measures the swaging of a cylindrical member, comprising:
   a coupling nut having a threaded internal opening;
   a gauge pin extending through said coupling nut internal opening, said gauge pin comprising:
   a first section of a first diameter, and
   a second section of a second diameter which is larger than said first diameter; and,
   a fastener means for securing said gauge pin to said coupling nut.

22. The device of claim 21 wherein a front end of said gauge pin extends past a front face of said coupling nut and a rear end of said gauge pin extends past a rear face of said coupling nut.

23. The device of claim 22 wherein said fastener means comprises:
   a groove provided on an outer periphery of said gauge pin at a location rearwardly of said coupling nut rear face; and,
   a snap ring which can be selectively secured in said gauge pin groove.

24. The device of claim 21 further comprising: a pair of spaced flanges extending radially outwardly from said gauge pin; and,
   a first seal member positioned between said flanges and adapted to seal between said gauge pin and said coupling nut.

25. The device of claim 21 further comprising:
   a circumferential groove provided in said gauge pin; and,
   a second seal member positioned in said circumferential groove and adapted to seal between said gauge pin and said coupling nut.

26. The device of claim 21 wherein said coupling nut threaded internal opening is adapted to cooperate with an external threaded section of a piston of the gauge.

* * * * *